(12) United States Patent
Suga

(10) Patent No.: US 6,483,626 B2
(45) Date of Patent: *Nov. 19, 2002

(54) DIRECT-VIEW-TYPE CONFOCAL POINT OPTICAL SYSTEM

(75) Inventor: Takeshi Suga, Hachioji (JP)

(73) Assignee: Olympus Optical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/517,569

(22) Filed: Mar. 2, 2000

(65) Prior Publication Data

US 2001/0043383 A1 Nov. 22, 2001

(30) Foreign Application Priority Data

Mar. 5, 1999 (JP) .......................................... 11-058536

(51) Int. Cl.⁷ .............................................. G02B 26/08
(52) U.S. Cl. ....................... 359/212; 359/201; 359/202; 359/215
(58) Field of Search ................................ 359/196, 201, 359/202, 212–219, 223, 225, 226, 368, 372, 385; 385/15, 23, 88, 147

(56) References Cited

U.S. PATENT DOCUMENTS

| 5,120,953 A | | 6/1992 | Harris |
| 5,629,790 A | | 5/1997 | Neukermans et al. |
| 5,742,419 A | | 4/1998 | Dickensheets et al. |
| 6,028,306 A | * | 2/2000 | Hayashi ...................... 359/368 |
| 6,172,789 B1 | * | 1/2001 | Kino et al. ................. 359/201 |
| 2002/0018276 A1 | | 2/2002 | Suga |

FOREIGN PATENT DOCUMENTS

| JP | 3-87804 | 4/1991 |
| JP | 9-230248 | 9/1997 |

* cited by examiner

*Primary Examiner*—James Phan
(74) *Attorney, Agent, or Firm*—Arnold International; Bruce Y. Arnold

(57) ABSTRACT

A direct-view-type confocal point optical system having a design wherein noise in the return light from an object being viewed is suppressed by ensuring that light reflected from various optical component surfaces is reflected away from the image light returned from the object being viewed. This is accomplished by insuring that any planar transmission or reflecting surfaces are non-normal to the scanning light, and by folding the light path at least 90 degrees, thereby enabling a longer optical path length than the actual distance between a point source of light source and an object being viewed so that the optical signal "noise" in the direct-view, confocal point optical system image is minimized.

9 Claims, 6 Drawing Sheets

DIRECT-VIEW-TYPE CONFOCAL POINT OPTICAL SYSTEM

BACKGROUND OF THE INVENTION

Japanese Laid-Open Application Nos. H9-230248 and H3-87804 each disclose a probe in which is mounted a small-sized, confocal point optical system. The confocal point optical systems disclosed by these references are of the side-view-type, in which the view field is orthogonal to the longitudinal direction (i.e., the insertion direction) of the probe.

On the other hand, FIG. 7 shows an endoscope having a direct-view-type optical system in which the insertion direction of the probe and the direction of the visual field correspond. When a side-view-type confocal point optical system probe is used through a channel, such as the forceps channel, of an endoscope, the observation range of the confocal point optical system probe is difficult to determine. However, in the case of an endoscope using a direct-view-type confocal point optical system, it is easier to specify the observation range of the endoscope image. An improvement in operability is thus achieved when using a direct-view-type confocal point optical system in an endoscope as compared to using a side-view-type confocal point optical system.

Thus, there is a need for a small-sized, direct-view-type confocal point optical system which can be used in conjunction with an endoscope. Because the reflection factor of objects normally viewed with an endoscope (e.g., tissue of a living organism) is low, the signal component which is reflected and then received to be viewed or photographed is very small. Therefore, it is essential to suppress, as much as possible, unwanted light (i.e. the noise component), such as light reflected by lens element surfaces and other reflecting surfaces of the optical system. This is especially the case in a direct-view-type optical system, wherein the optical components generally tend to be arranged along a straight line. For this reason, it is important to reduce the noise component of light in the image of the object being observed.

BRIEF SUMMARY OF THE INVENTION

This invention relates to a small-sized confocal point optical system, especially a small-sized confocal point optical system which is used through a channel of an endoscope. The object of the invention is to reduce the noise component of light in an image of an object being observed using a direct-view-type confocal point optical system in conjunction with an endoscope.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

A direct-view-type confocal point optical system according to the invention includes: a pinhole-sized aperture that serves as a point source of light rays emitted within a cone angle along a first optical axis; an optical scanning system for scanning the light beam from the point light source; a condensing optical system, having a second optical axis, for condensing the light beam from the point light source onto a surface as a point of light that is confocal with the point light source formed by the pinhole-sized aperture. The optical scanning system has several reflecting surfaces which include at least one scanning mirror. The several reflecting surfaces are arranged so that a light beam may be incident at a non-normal angle. The first optical axis is substantially parallel (within 30 degrees) to the second optical axis, enabling the light path to be folded at least 90 degrees to thereby increase the optical path without increasing the overall length of the confocal point optical system. This enables a longer optical path length than the actual distance between a point light source and an object being viewed so that optical signal "noise" returned to the optical fiber is minimized. In one embodiment, the condensing optical system has several transmission surfaces, the several transmission surfaces are curved surfaces, or are flat surfaces arranged so that a light beam may be incident at a non-normal angle. In another embodiment, the scanning optical system is provided with at least one transmission surface that is arranged so that the light beam is incident at a non-normal angle.

Several embodiments of the invention will now be explained in detail with reference to the drawings.

Embodiment 1

Figure 1:
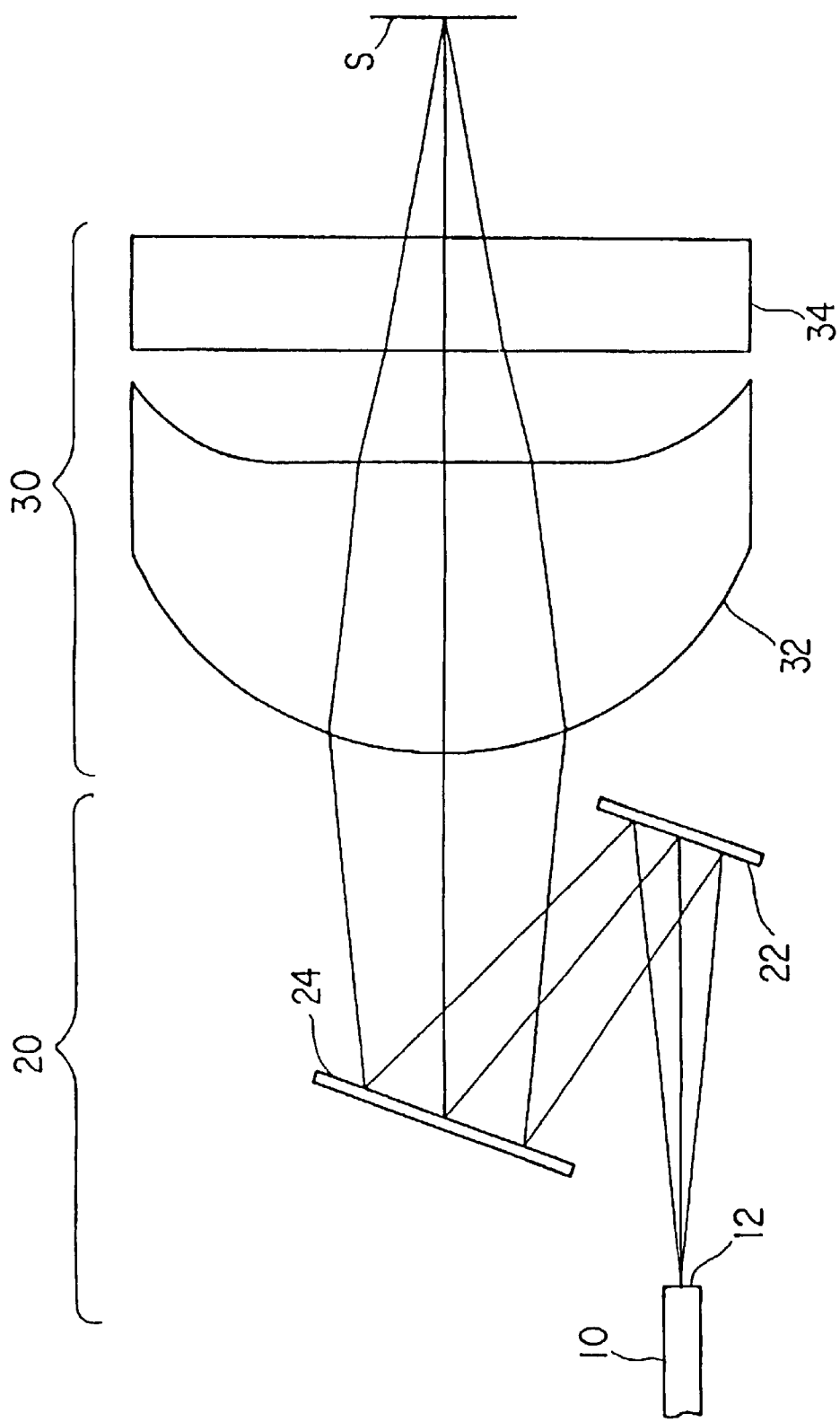
FIG. 1 shows a direct-view-type confocal point optical system according to a first embodiment of the invention.

A direct-view-type confocal point optical system according to a first embodiment is illustrated in FIG. 1. As shown in FIG. 1, an optical fiber 10 carries light from a light source (not shown) and emits the light from an end surface of the optical fiber as a point light source, an optical scanning system 20 scans the light beam, and a condensing optical system 30 images the light from the point light source onto a surface S to be examined. The optical scanning system 20 is provided with a fixed reflecting surface 22 which reflects the light beam from an optical fiber 10 in a given direction, and a scanning mirror 24 reflects the light beam, in a two-dimensional scan, from the reflecting surface 22 to the condensing optical system 30.

The condensing optical system 30 is provided with a lens, such as lens element 32, which changes the diverging light beam from the optical scanning system 20 to a converging light beam. A cover glass 34 is provided in order to protect the lens. Preferably, the optical fiber is a single-mode fiber. The end face 12 of optical fiber 10 functions, substantially, as a pinhole-sized aperture. The condensing optical system 30 is confocal in that it forms an image of this pinhole-sized aperture at the surface S. The reflecting surface 22 is arranged so that the light beam is incident on surface 22 non-normally. Similarly, the scanning mirror 24 is arranged so that the light beam is incident thereon non-normally. Scanning mirror 24 may be driven by electrostatic forces so as to oscillate around two axes in order to impart a two-dimensional scan to the image of the point light source formed on surface S. The two-dimensional scanning mirror is produced using integrated circuit manufacturing techniques, and is supported by a gimbal structure (not shown). The structure of the scanning mirror 24 is the same as those well known in the prior art, (see, for example, U.S. Pat. No. 5,629,790) and will not be discussed further herein. Cover glass 34 consists of an optically transparent, parallel plate.

The optical axis of the light beam from the optical fiber 10 is offset from the optical axis of the condensing optical system, and the two axes are, preferably, parallel. However, it is sufficient if they are substantially parallel (within 30°). After the diverging light beam from optical fiber 10 has been sequentially reflected by reflecting surface 22 and scanning mirror 24, the light beam is changed into a converging light beam by a lens, such as lens element 32, which then passes through cover glass 34 and is imaged as a point onto surface S. The image point scans surface S as a result of the two-dimensional oscillation of the scanning mirror 24.

Light reflected from the surface S returns via the same path, and the reflected light is used to view the surface S. In this embodiment, because the reflecting surface 22 and the scanning mirror 24 are arranged so that incident outgoing and incoming light are incident non-normally (i.e., other than perpendicular to the surfaces) light scattered at reflecting surface 22 and scanning mirror 24 does not seriously degrade the image light from surface S. Moreover, because each surface of the lens element is a curved surface, the return of scattered light from these surfaces does not seriously degrade the image light from surface S. Thus, a direct-view-type confocal point optical system having a low noise component in the image to be viewed or photographed is obtained.

Figure 5:
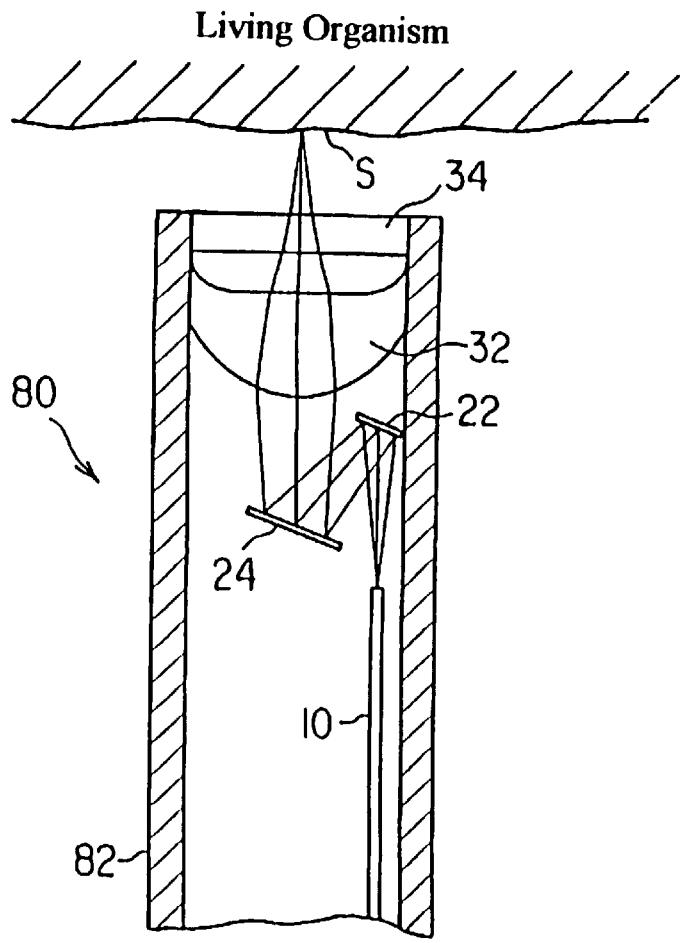
FIG. 5 is a sectional view of a direct-view-type confocal point optical system probe which employs the direct-view-type confocal point optical system of FIG. 1.

FIG. 5 is a sectional view of a direct-view-type confocal point optical system probe 80 which uses the direct-view-type confocal point optical system of this embodiment. The probe 80 is composed of the optical system shown in FIG. 1 positioned inside a cylindrical frame 82.

Figure 7:
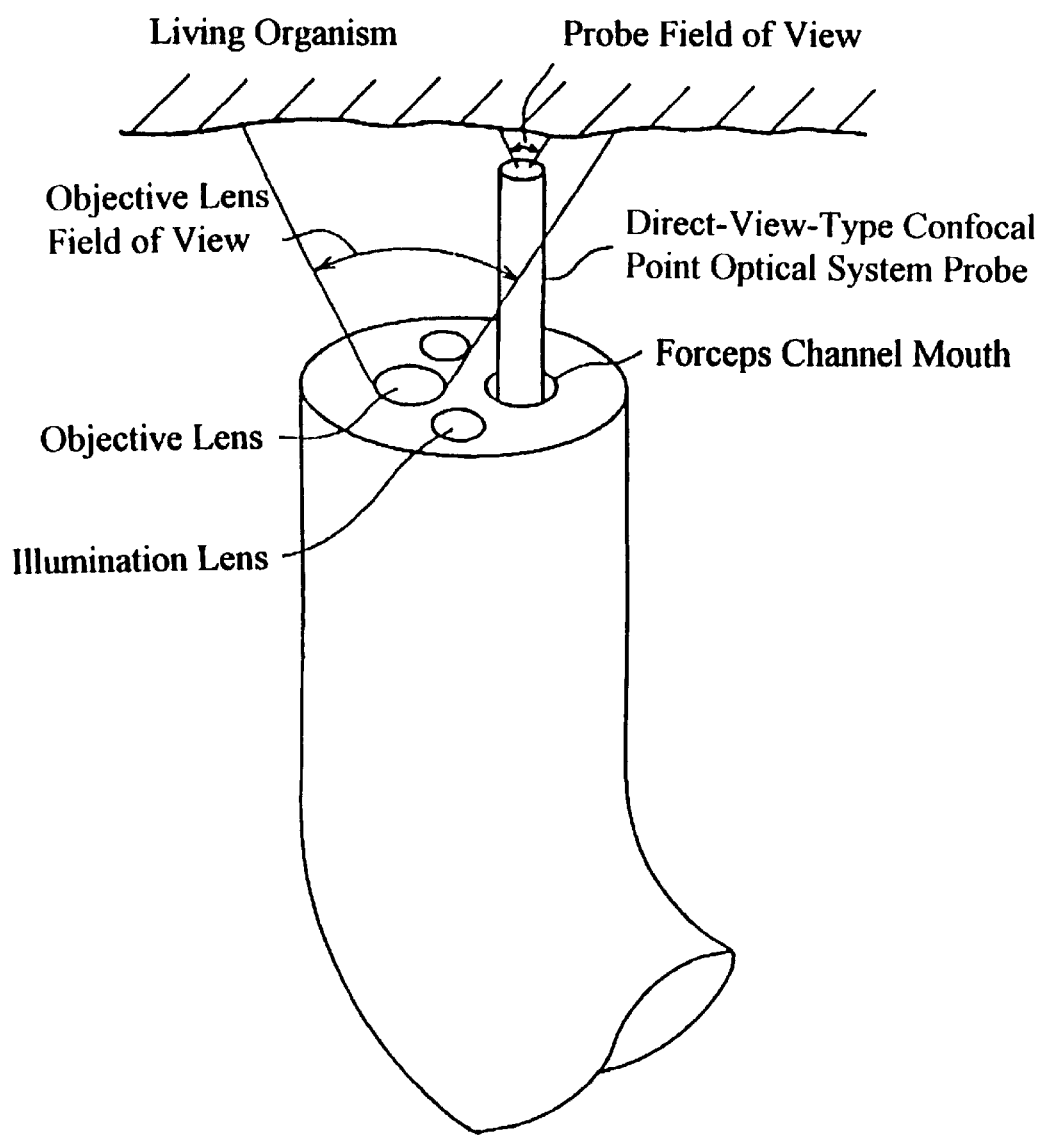
FIG. 7 shows a direct-view-type confocal point optical system probe being used within the forceps channel of a general, direct-view-type endoscope.

As shown in FIG. 7, such a probe is suitable for insertion into a channel, such as a forceps channel, of a general direct-view-type endoscope, and is brought near to a surface of a living organism to be viewed or photographed. During this process, the operator can view the surface of the living organism as well as the approach of the probe while in the vicinity of the surface by viewing a visual field provided by an objective lens at the end of the endoscope. In this manner, living organism can be optically observed using the wide-viewing angle of the objective lens. And, a narrow view of the surface of the organism can also be obtained using the direct-view type confocal point optical system probe 80.

Figure 6:
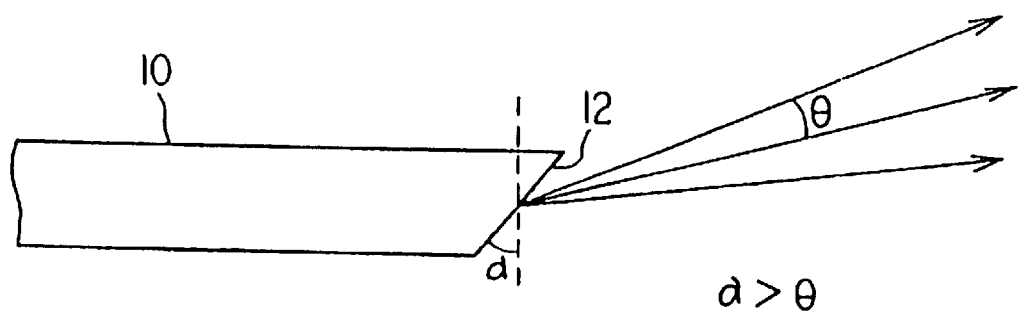
FIG. 6 shows an end face of an optical fiber that has been cut diagonally that is applicable to the direct-view-type confocal point optical system of FIG. 1.

In FIG. 1, the end face 12 of optical fiber 10 is perpendicular to the longitudinal direction of an optical fiber 10. This can cause unwanted "noise" to be returned with the image signal, due to back-reflected light at this surface being combined with the image light. However, as shown in FIG. 6, the end face 12 of the optical fiber 10 may be cut non-normally to the longitudinal direction of optical fiber 10. Moreover, if the end face 12 is cut at an angle α larger than the angle θ, where θ equals the numerical aperture NA of the optical fiber 10, reflected light at the end face 12 will not propagate within optical fiber 10. Therefore, the noise component which occurs due to light reflected by the end face 12 of an optical fiber 10 can be eliminated.

Embodiment 2

Figure 2:
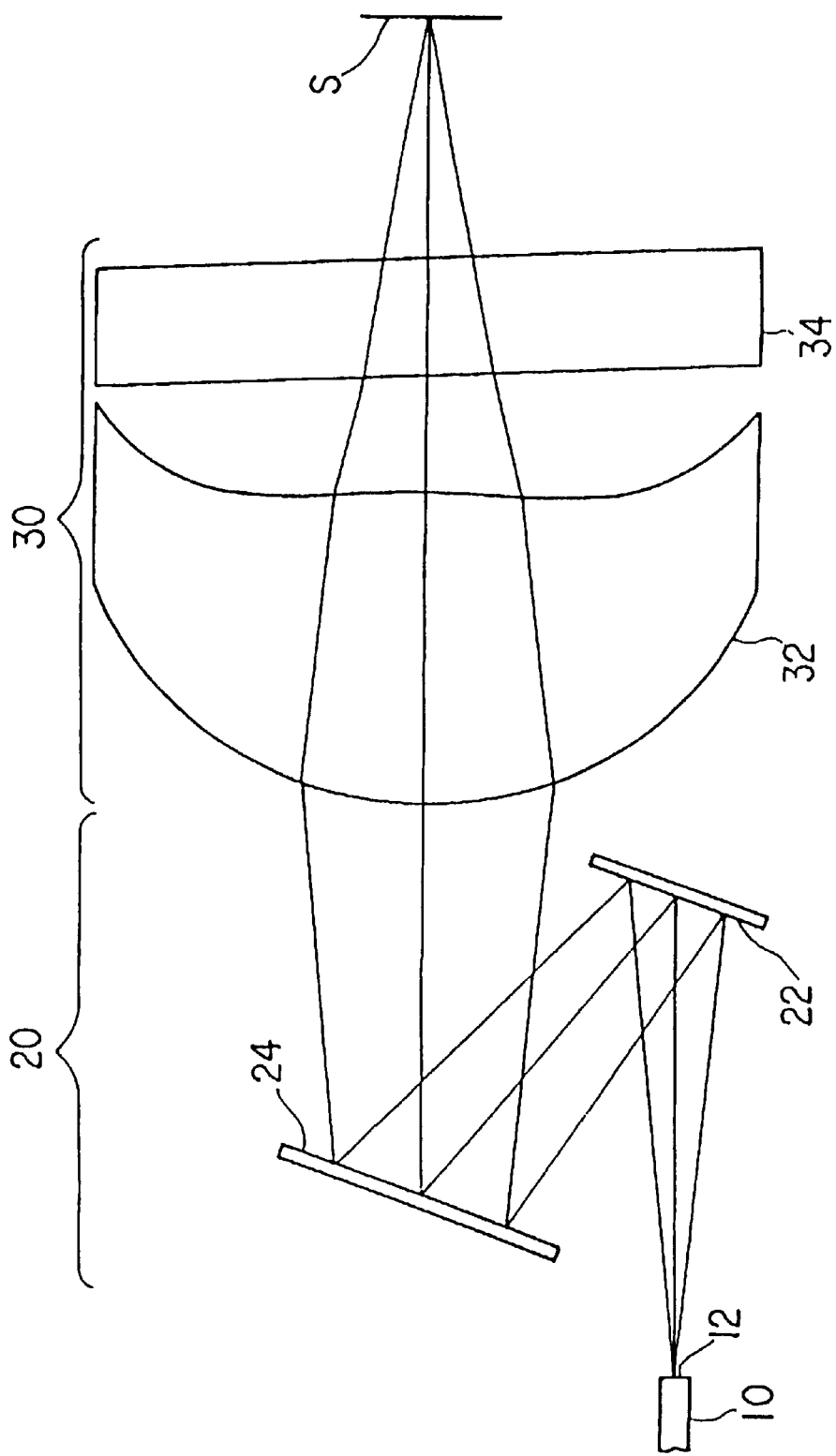
FIG. 2 shows a direct-view-type confocal point optical system according to a second embodiment of the invention.

A direct-view-type confocal point optical system according to a second embodiment of the invention is shown in FIG. 2. This embodiment is identical to Embodiment 1 except, as shown in FIG. 2, the cover glass 34 is made to be non-normal to the optical axis. This embodiment has superior performance as compared to Embodiment 1, in that light reflected from the surfaces of the cover glass 34 is not returned to the optical fiber 10 and thus "noise" in the image of surface S is reduced as compared to Embodiment 1.

Embodiment 3

Figure 3:
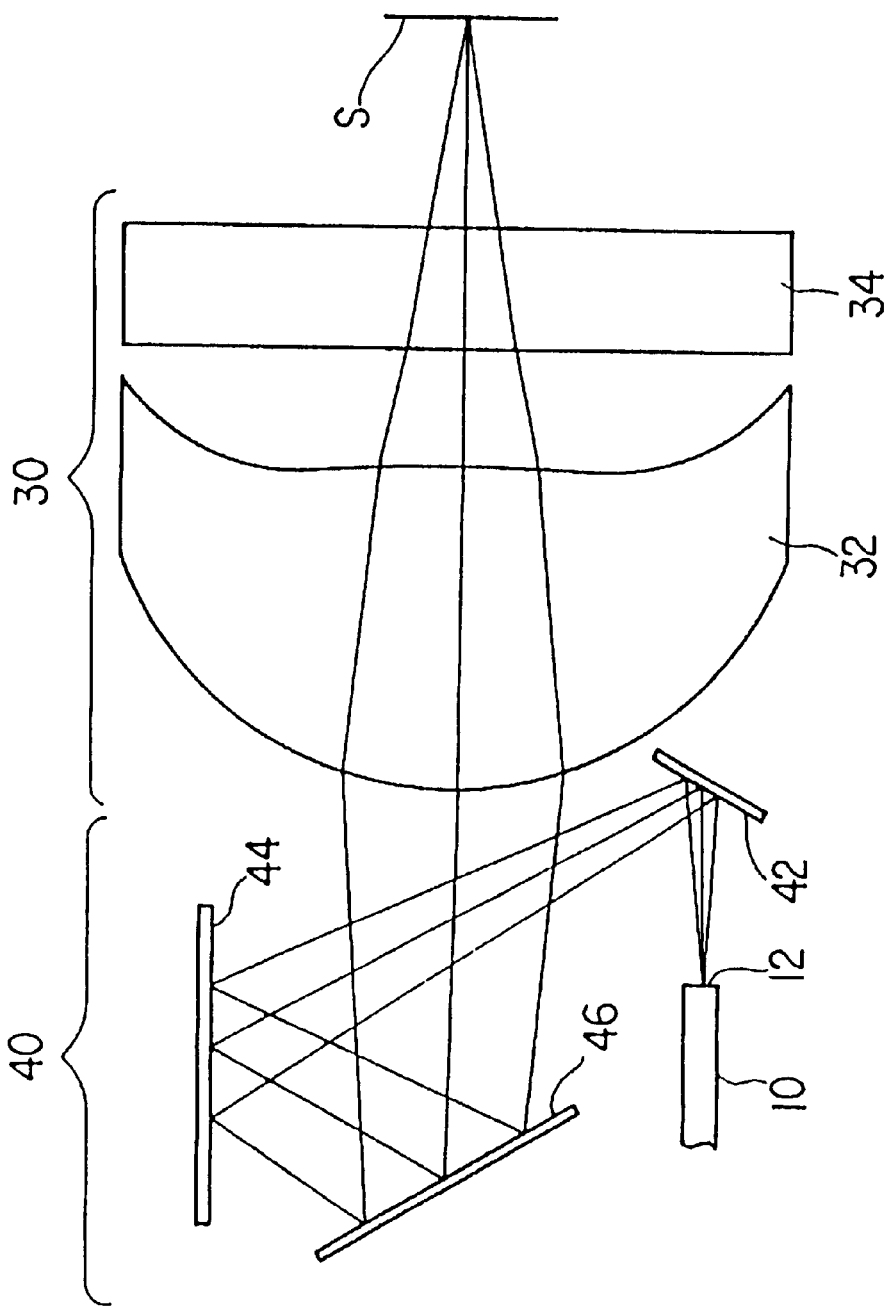
FIG. 3 shows a direct-view-type confocal point optical system according to a third embodiment of the invention.

A direct-view-type confocal point optical system according to a third embodiment is shown in FIG. 3. This embodiment is identical to Embodiment 1 except the optical scanning system is different. As shown in FIG. 3, the optical scanning system 40 is provided with a first reflecting surface 42 which reflects the light beam from an optical fiber 10, a second reflecting surface 44 reflects the light beam from the first reflecting surface 42, and a third reflecting surface 46 which reflects the light beam from the second reflecting surface 44 to the condensing optical system 30. One of the first reflecting surface 42, the second reflecting surface 44, and the third reflecting surface 46 consists of the scanning mirror by which a two-dimensional scan is obtain by oscillating the scanning mirror in two dimensions. The first to third reflecting surfaces 42, 44, and 46 are arranged so that the incident beam is non-normal to the surfaces. Therefore, the light reflected at the first to third reflecting surfaces 42, 44, and 46 is not re-directed back into the fiber as "noise" which degrades the quality of the image light reflected from surface S back into the fiber.

Embodiment 4

Figure 4:
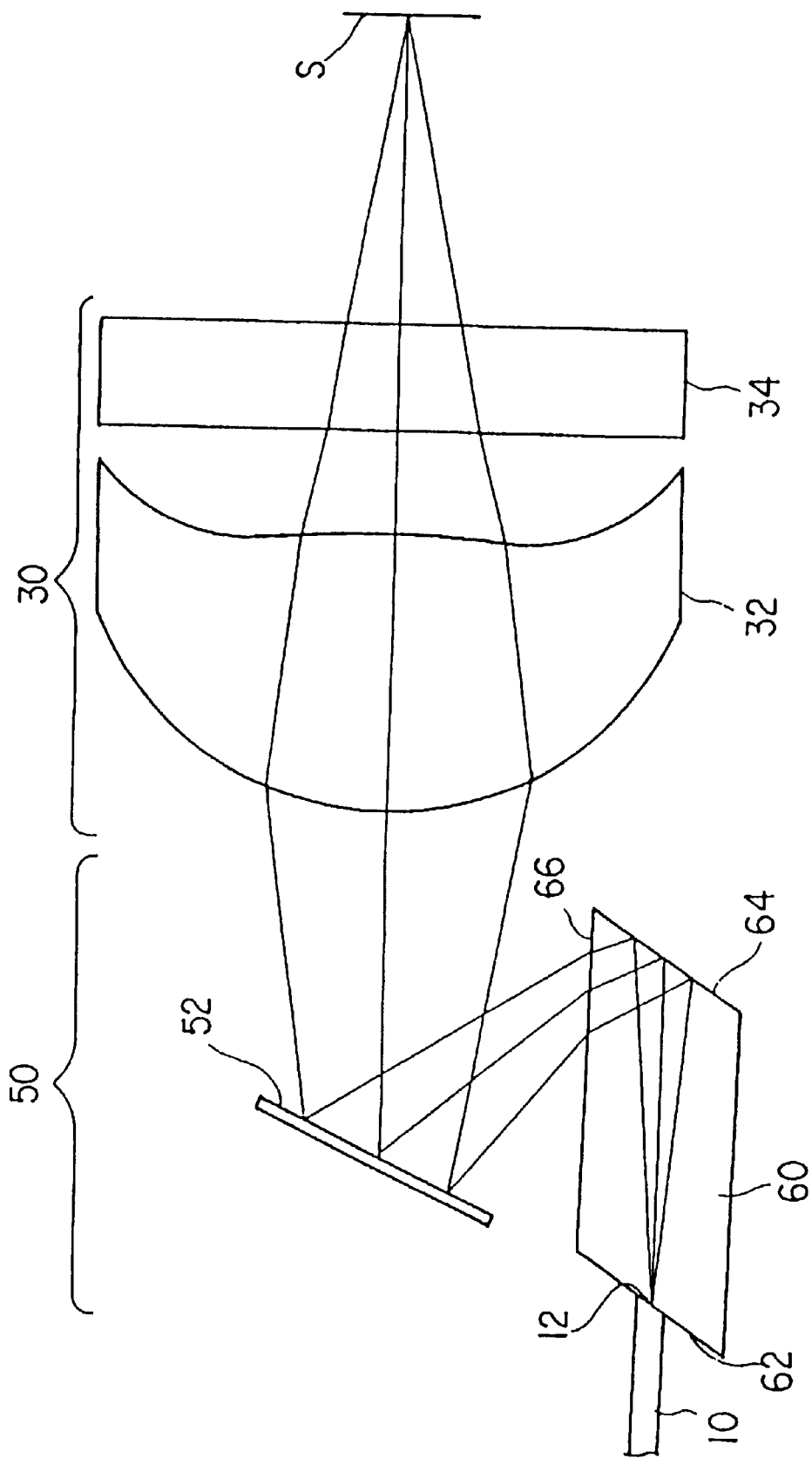
FIG. 4 shows a direct-view-type confocal point optical system according to a fourth embodiment of the invention.

A direct-view-type confocal point optical system according to a fourth embodiment is shown in FIG. 4. This embodiment is the same as the first embodiment except that the optical scanning system is different. As shown in FIG. 4, optical scanning system 50 is provided with a prism 60 for reflecting the light beam from the optical fiber 10. Scanning mirror 52 scans the light beam from the prism 60 in a two-dimensional manner. Prism 60 is provided with a surface 62 for receiving the light beam from the fiber 10. Reflecting surface 64, on the opposite side of the prism from surface 62, reflects the light beam, and surface 66 transmits the light beam from the fiber. The surface 62 of prism 60 is inclined to the optical axis the same as the end face 12 of the optical fiber 10, and is optically coupled to the core of the optical fiber by an index-matching adhesive to prevent any reflection at the surface 62. The surface 64 of prism 60 is made highly reflective to the incident light by being metalized, with aluminum, for example. The prism 60 is arranged so that a light beam is incident at a non-normal angle onto reflecting surface 64 and onto transmission surface 66. Moreover, the scanning mirror 52 is arranged so that the light beam is incident thereon only at non-normal angles. In this embodiment, the noise component of light returned from the surface S is low, as a result of there being no reflection at surface 62, and as a result of the incident angles of light onto reflecting surface 64, transmission surface 66 and scanning mirror 52 being other than at normal incidence. Moreover, since reflecting surface 64 formed on prism 60 is of a comparatively large size, manufacture and assembly is made easy. Thus, this embodiment has an even lower noise component in the image light than the first or the third embodiment.

The invention being thus described, it will be obvious that the same may be varied in many ways. For example, in Embodiment 3, it is also possible to employ two scanning surfaces selected from the first reflecting surface 42, the second reflecting surface 44, and the third reflecting surface 46, with each scanning surface performing a scan in a single dimension, and with the remaining surface being fixed. As another example, in Embodiment 4, rather than being made reflective by having a metal coating applied to surface 64, this surface may instead be inclined to such an extent that all rays striking it from optical fiber 10 undergo total internal reflection. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A direct-view-type confocal point optical system, said direct-view-type confocal point optical system comprising:

an aperture that serves as a point source of light rays emitted within a cone angle along a first optical axis;

an optical scanning system having several reflecting surfaces which includes at least one scanning mirror to scan the light from the point light source;

a condensing optical system having a second optical axis, said condensing optical system forming an image of said point light source on a surface; wherein
        the several reflecting surfaces of the optical scanning system are arranged so that each reflecting surface is inclined at a non-normal angle to all light rays emitted from the point light source; and
        said first optical axis is within 30 degrees of being parallel to said second optical axis.

2. The direct-view-type confocal point optical system of claim 1, said condensing optical system including a transmission surface arranged so that the transmission surface is at a non-normal angle to the light that is incident thereon from the point source of light.

3. The direct-view-type confocal point optical system of claim 1, said optical scanning system including a transmission surface arranged so that the transmission surface is at a non-normal angle to the light that is incident thereon from the point source of light.

4. The direct-view-type confocal point optical system of claim 1, wherein said point source of light is formed by an optical fiber that has light input to one end, with the other end of the optical fiber having an output surface that is non-normal to a central axis of the optical fiber at the output surface, said output surface forming a pinhole-sized aperture.

5. The direct-view-type confocal point optical system of claim 4, wherein the optical fiber is a single-mode optical fiber.

6. The direct-view-type confocal point optical system of claim 4, said output surface forming an angle, as measured from a plane perpendicular to the optical fiber core at the output surface, that is greater than the numerical aperture of the optical fiber.

7. The direct-view-type confocal point optical system of claim 1, wherein light input to the optical scanning system is folded at least 90 degrees.

8. The direct-view-type confocal point optical system of claim 1, wherein the at least one scanning mirror scans light incident thereon in two-dimensions.

9. The direct-view-type confocal point optical system of claim 1, wherein the optical scanning system includes two scanning mirrors, each scanning light incident thereon in a single plane that is different from the scanning direction of the other scanning mirror so that light from the point source of light is scanned in two dimensions.

* * * * *